United States Patent
Chowdhury et al.

(10) Patent No.: US 8,273,491 B2
(45) Date of Patent: Sep. 25, 2012

(54) METHOD TO REDUCE TIME UNTIL ACCEPTABLE DRIVE AWAY IN A FUEL CELL SYSTEM

(75) Inventors: Akbar Chowdhury, Pittsford, NY (US); Seth E. Lerner, Honeoye Falls, NY (US); Steven G. Goebel, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 480 days.

(21) Appl. No.: 12/704,230

(22) Filed: Feb. 11, 2010

(65) Prior Publication Data

US 2011/0086284 A1    Apr. 14, 2011

Related U.S. Application Data

(60) Provisional application No. 61/249,866, filed on Oct. 8, 2009.

(51) Int. Cl.
*H01M 8/04* (2006.01)

(52) U.S. Cl. .................................................. 429/429
(58) Field of Classification Search .................. None
See application file for complete search history.

(56) References Cited

U.S. PATENT DOCUMENTS

| | | | |
|---|---|---|---|
| 7,282,286 B2 * | 10/2007 | Hayashi et al. | 429/429 |
| 2008/0081225 A1 | 4/2008 | Arthur et al. | |
| 2008/0187804 A1 | 8/2008 | Arthur et al. | |
| 2010/0190075 A1 | 7/2010 | Frost et al. | |

* cited by examiner

*Primary Examiner* — Jonathan Crepeau
(74) *Attorney, Agent, or Firm* — Dinsmore & Shohl LLP

(57) ABSTRACT

Methods and systems of reducing the start-up time for a fuel cell are described. One method of reducing the start-up time includes: concurrently supporting load requests for the fuel cell and stabilizing the voltage of the fuel cell; wherein stabilizing the voltage of the fuel cell comprises: providing a flow of hydrogen to the fuel cell and opening an anode valve, wherein the hydrogen flow continues for predetermined volume or a predetermined time; and ending voltage stabilization after the predetermined volume or predetermined time is exceeded while continuing to support load requests for the fuel cell.

21 Claims, 4 Drawing Sheets

METHOD TO REDUCE TIME UNTIL ACCEPTABLE DRIVE AWAY IN A FUEL CELL SYSTEM

CROSS REFERENCE TO RELATED APPLICATION

This application claims the benefit of U.S. Provisional Application Ser. No. 61/249,866, which was filed on Oct. 8, 2009, which is incorporated herein by reference.

BACKGROUND OF THE INVENTION

The invention relates generally to fuel cell systems, and more particularly to methods and systems of starting fuel cell systems.

To start a fuel cell system, reactants must be available at the cell's active area such that electric current can be generated. This is typically the main function of the start sequence if the system had been off or in a standby state. For vehicle applications, it is desirable to complete the start sequence so that the driver is able to request full power soon after the start request is made. In addition, when the fuel cell system is exiting from a standby mode, it is desirable that the system is able to run at capacity soon after the wake up request is made.

To prepare a fuel cell system such to operate at full capacity, the start sequence will typically include an anode flush function and an anode fill function. The flush function removes non-reactants from the cell flow fields. The fill function increases the hydrogen concentration at the active sites to the desired level. The fill function typically accounts for the majority of the time needed to start for anode side functions. This is due to a combination of exhaust emissions requirements and non uniform flow characteristics within the stack plumbing and stack. In practice with a non-ideal header purge, the anode flush function will purge non-reactants to a level as illustrated in FIG. 1. Even an ideal flush may require additional fill time to get uniform hydrogen to all cells. This would typically be random cells based on cell flow resistance variability.

At the end of the anode flush after a non-ideal header purge, which typically occurs during the start sequence, the anode will still contain a percentage of non-reactant gas in the top cells. If full current is requested at that time, the cells that are only partially filled with hydrogen will not be able to support the current, causing a sharp drop in cell voltage. To prevent this from occurring, a voltage stabilization function is employed to fill the remainder of the stack with hydrogen. A lower hydrogen flow rate is used for this function, and the flow rate is controllable so that the emissions requirement is not violated. However, this is done at a cost of increased start length. The typical time to perform the anode flush is about 1 second, while the additional anode fill and voltage stabilization can take up to 4 seconds.

Therefore, there is a need for an improved start-up method for a fuel cell.

SUMMARY OF THE INVENTION

Methods and systems of reducing the start-up time for a fuel cell are described. One method of reducing the start-up time includes: initiating a start sequence; after initiating the start sequence, concurrently initiating a run sequence including supporting load requests for the fuel cell, and stabilizing a voltage of the fuel cell; wherein stabilizing the voltage of the fuel cell comprises: providing a flow of hydrogen to the fuel cell and opening an anode valve, wherein the hydrogen flow continues for a predetermined volume of hydrogen or a predetermined time; and ending voltage stabilization after the predetermined volume of hydrogen or the predetermined time is exceeded while continuing the run sequence including supporting the load requests for the fuel cell.

DETAILED DESCRIPTION OF THE INVENTION

The amount of time needed to reliably start a fuel cell system can be reduced by allowing the anode fill/flush function to extend into run mode. The function will remain enabled in run mode until it is determined using the cell voltage and valve flow resistance (gas composition) monitoring that the stack is able to operate at full capacity. The benefit of employing this voltage stabilization routine is to ensure that all cells are purged of non-reactants and contain a local hydrogen concentration at a high enough level to sustain full current loads for each cell. By shifting this routine to occur post start while in full run mode, the time until acceptable drive away or start length can be reduced significantly.

The voltage stabilization function typically utilizes a center bleed valve, and hydrogen is injected into both sub-stacks concurrently. Another variation could involve flowing hydrogen sequentially at a predetermined switching rate. Other anode valves, such as bleed valves, could be utilized with or instead of the center drain valve, depending on the system. The voltage stabilization function is enabled prior to activation of the run mode through the first few seconds of the run mode. The length of time that voltage stabilization will occur depends on certain exit conditions. These exit conditions may include a minimum time, cell voltage spread, stack voltage bounce, or a bleed request.

If a large power request occurs during voltage stabilization, the function should respond appropriately so that the emissions requirements are not exceeded. The anode flow rate should increase to sustain the higher load. This is also true for the cathode air flow rate. However, the anode reacts much faster than the time required to generate enough compressor flow for the cathode and subsequently dilution air. In this situation, the center bleed valve closes until enough dilution air is available. However, in order to ensure that the stack is fully purged, it will resume anode flow after enough dilution air is available.

Another variation to handle large power steps is to maintain the correct hydrogen flow through the anode that corresponds to the amount of dilution flow in the exhaust to achieve a targeted exhaust concentration. This would allow the valve to remain open during the transient condition.

Figure 1:
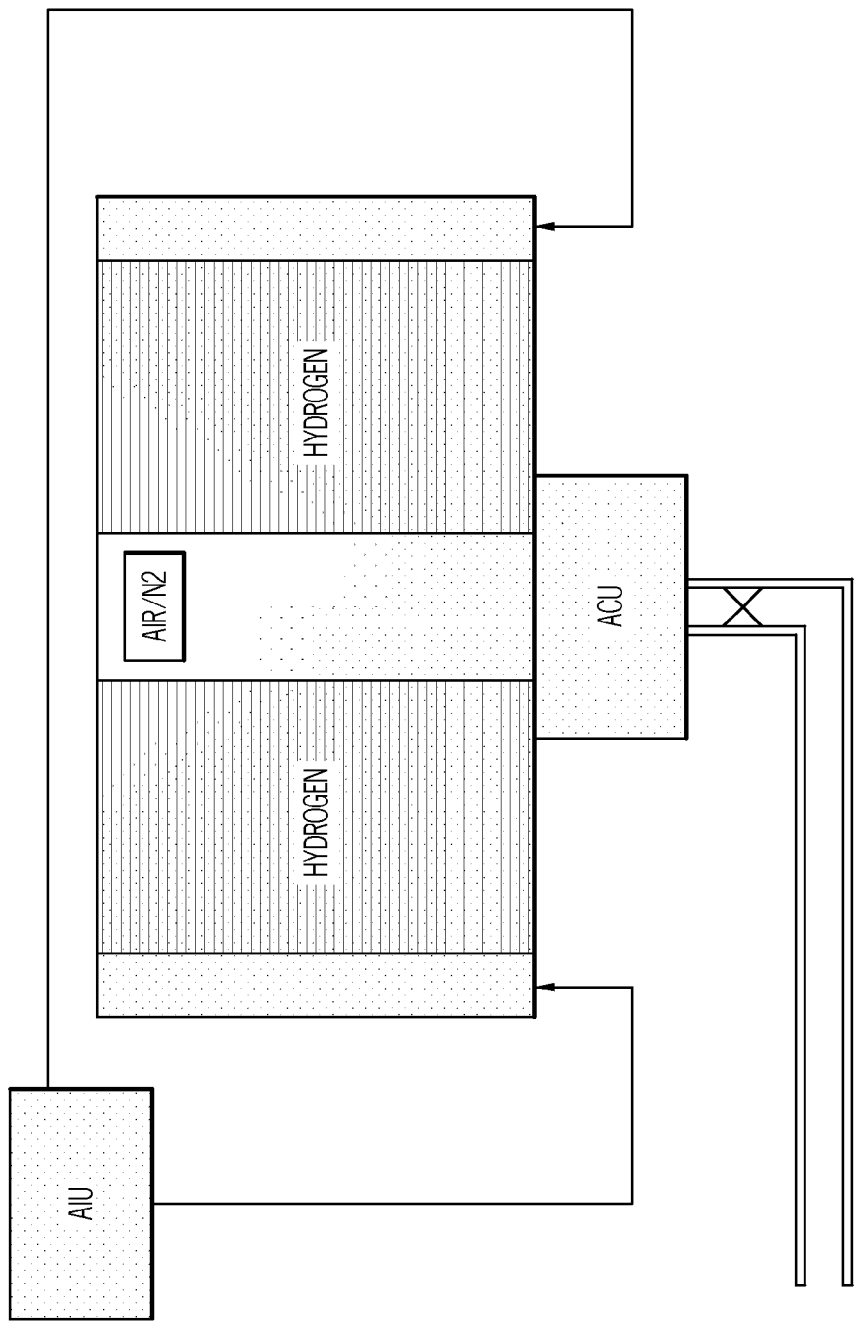
FIG. 1 is an illustration of the anode gas composition after a typical anode flush.
Figure 2:
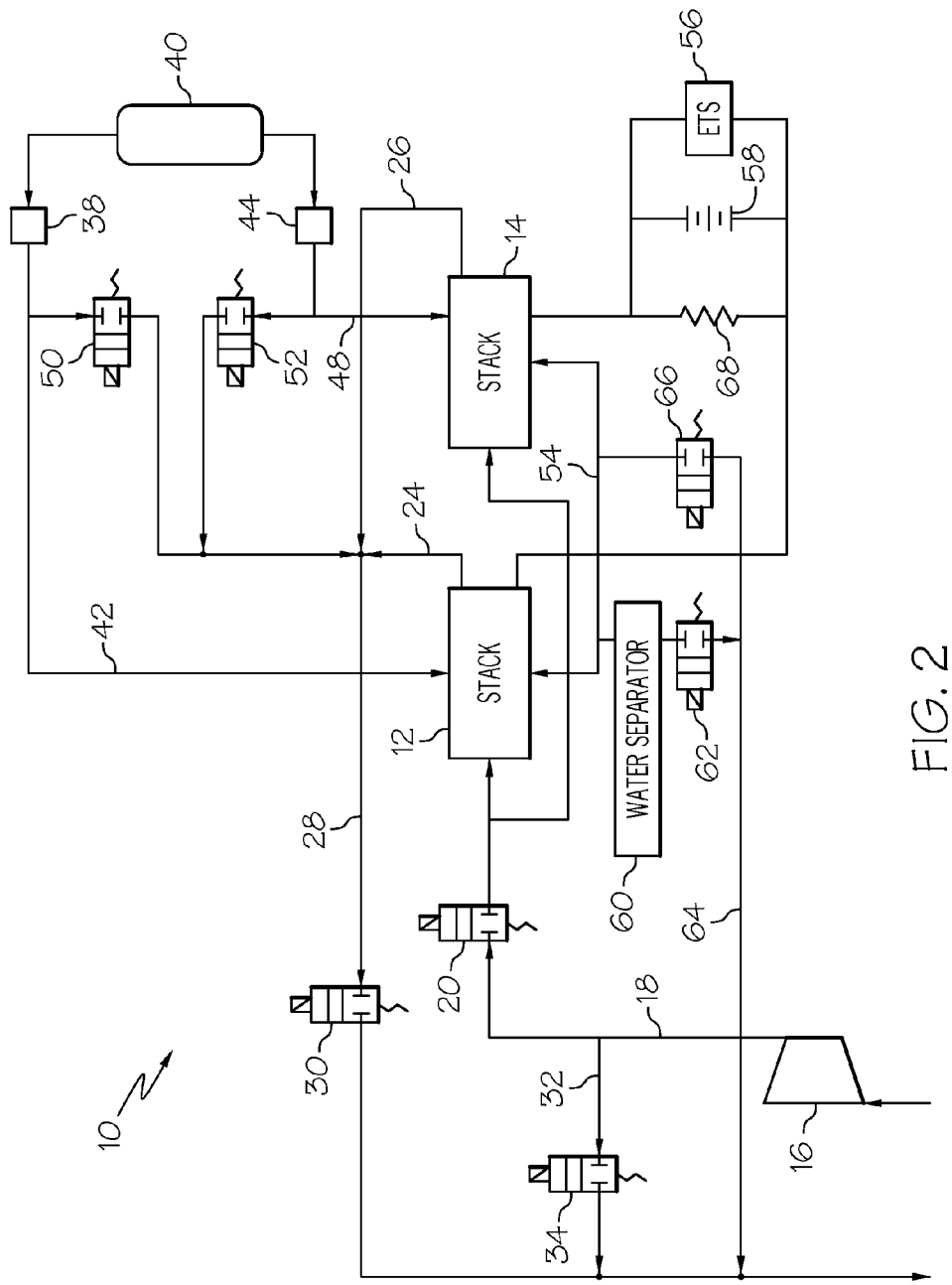
FIG. 2 is a schematic block diagram of a fuel cell.

FIG. 2 illustrates one embodiment of a fuel cell system. The system is described more fully in U.S. application Ser. No. 11/859,300, filed Sep. 21, 2007, entitled Method for Fast and Reliable Fuel Cell Systems Start-ups, which is incorporated herein by reference. Many other embodiments are possible.

FIG. 2 shows a fuel cell system 10 including a first split fuel cell stack 12 and a second split fuel cell stack 14. A compressor 16 provides cathode input air on cathode input line 18 to the stacks 12 and 14 through a normally closed cathode input valve 20. Cathode exhaust gas is output from the split stack 12 on line 24, and cathode exhaust gas is output from the split stack 14 on line 26 where the cathode exhaust gas is combined into a single cathode output line 28. A normally closed cathode back pressure valve 30 controls the flow of the cathode exhaust gas through the line 28. A cathode by-pass line 32 between the input line 18 and the output line 28 allows the cathode input air to by-pass the stacks 12 and 14. A normally closed by-pass valve 34 controls whether the cathode air by-passes the stacks 12 and 14. If the valves 20 and 30 are closed and the valve 34 is open, air from the compressor 16 will by-pass the stacks 12 and 14. Typically, a cathode humidification unit (not shown) will be provided at a suitable location in the cathode input line 18.

In this arrangement, the stacks 12 and 14 employ anode flow-shifting where the anode reactant gas flows back and forth through the stacks 12 and 14 at a predetermined cycle in a manner that is well understood to those skilled in the art. An injector 38 injects hydrogen gas from a hydrogen gas source 40 through anode line 42 to the split stack 12, and an injector 44 injects hydrogen gas from the hydrogen source 40 through anode line 48 to the split stack 14 in an alternating sequence. A connector line 54 connects the anode sides of the stacks 12 and 14.

A water separator 60 is coupled to the connector line 54 and collects water in the anode gas flow between the stacks 12 and 14. A normally closed drain valve 62 can be employed that is periodically opened to vent the water to the cathode exhaust gas line 28 on line 64. Further, an anode exhaust gas purge valve 66 can be provided in the connection line 54.

As discussed above, it is desirable to bleed the anode side of the stacks 12 and 14 periodically to remove nitrogen that may otherwise dilute the hydrogen and affect cell performance. Normally closed bleed valves 50 and 52 are provided for this purpose. When an anode bleed is commanded, the bleed valve 50 or 52 is opened, and the bled anode exhaust gas is sent to the cathode exhaust gas line 28 depending on which direction the hydrogen gas is currently flowing. Particularly, if the hydrogen gas is being injected into the split stack 12 from the source 40 when a bleed is triggered, then the bleed valve 52 is opened. Likewise, if the hydrogen gas is being injected into the split stack 14 from the source 40 when a bleed is triggered, then the bleed valve 50 is opened. The flow-shifting will typically occur several times during a normal bleed duration so that the bleed valves 50 and 52 have to be opened and closed several times in time with the flow switching.

The fuel cell stacks 12 and 14 generate current. During normal stack operation, the current generated by the stacks 12 and 14 is used to drive system loads, such as an electrical traction system (ETS) 56 on a vehicle. During a shut-down sequence, the current generated by the stacks 12 and 14 may be used to charge a battery 58, or be dissipated by other system components, and then be dissipated by a resistor 68.

At one system shut-down sequence, the compressor 16 is stopped, and the valves 20 and 30 are closed to seal the cathode side of the stacks 12 and 14. The flow of hydrogen is continued so that any remaining oxygen in the stacks 12 and 14 is consumed. The current generated by the stacks 12 and 14 is sent to the battery 58. When the stack power decreases to another predetermined level, the contactors are opened, and the stack load is switched to the resistor 68. Particularly, once the voltage has degraded to a fixed cut-off voltage, the stack load is switched to the resistor 68. The cut-off voltage could be the lower limit of a DC/DC converter (not shown), or the lower limit of a power device. The objective of the battery load is to consume and/or store any energy that otherwise would have been wasted. It also reduces the energy consumption requirements of the resistor load.

Once the oxygen has been consumed from the stacks 12 and 14, the hydrogen flow is turned off, and the valves 50, 52, 62 and 66 are closed to seal the anode side of the stacks 12 and 14. When the system 10 is shut-down in this manner, the stacks 12 and 14 include an $N_2/H_2$ mixture in both the cathode side and the anode side. Over time, air will leak into the stacks 12 and 14, and the hydrogen in the stacks 12 and 14 will initially consume the oxygen. Additionally, the hydrogen will slowly leak out of the stacks 12 and 14. As a result, the composition of the gases within the stacks 12 and 14 will vary over time between a hydrogen rich mixture in nitrogen and water to an air mixture.

The amount of hydrogen that is used at startup to purge the stacks 12 and 14 can be calculated based on the volume of the anode side of the stacks 12 and 14, the temperature of the stacks 12 and 14, and the pressure within the stacks 12 and 14. The hydrogen flow into the stacks 12 and 14 should be roughly one anode volume. If an insufficient amount of hydrogen flows into the stack, some of the cells might be left containing an $H_2/O_2$ front. If too much hydrogen flows into the first stack, excess hydrogen is wasted to the exhaust and might enter into the second stack through compression, leading to a stagnant hydrogen/air front causing excessive voltage degradation. The loop volume for each of the stacks 12 and 14 is calculated and this information is combined with the hydrogen flow rate during the start-up to determine the purge time for the first stack.

Figure 3A:
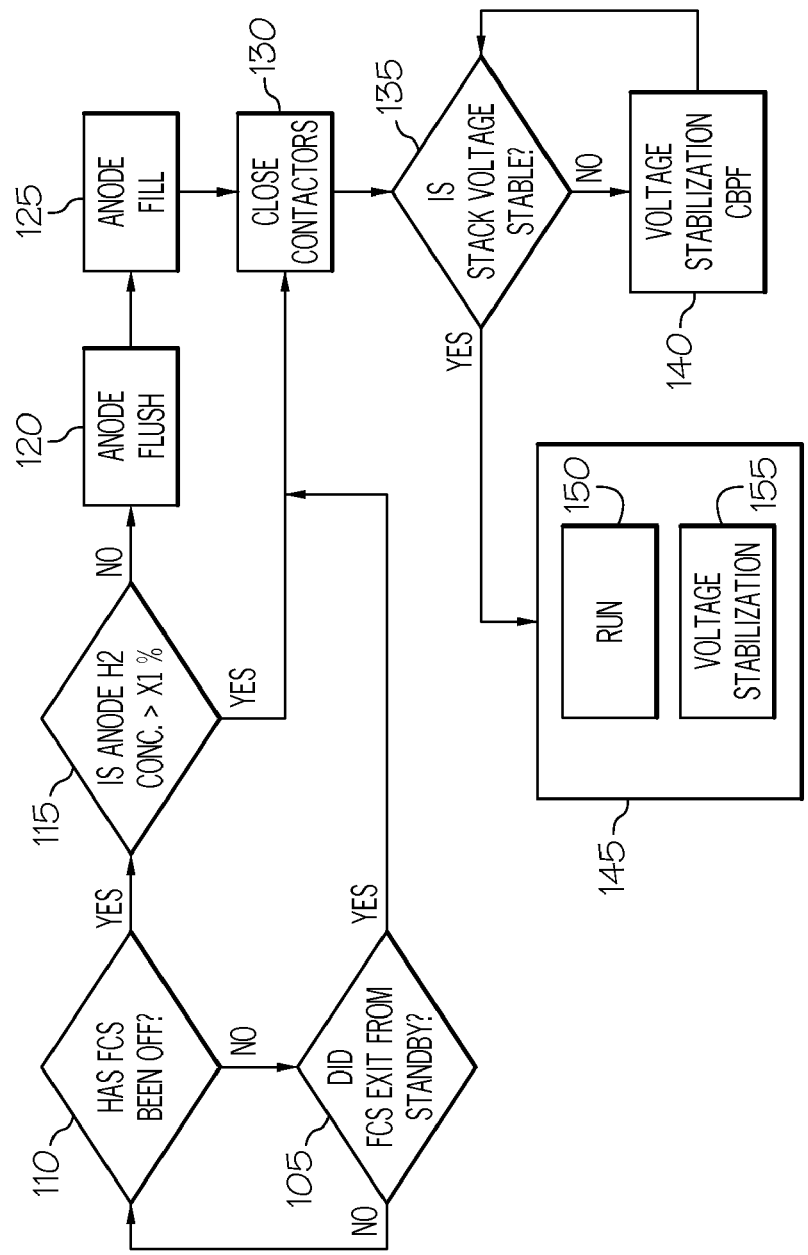
FIGS. 3A-B are flow chart diagrams showing one embodiment of a process for providing a fuel cell start-up of the present invention.

FIG. 3A shows one embodiment of the start-up sequence. At decision block 105, the system determines whether the fuel cell system is exiting from standby. If it is not exiting from standby, the system proceeds to decision block 110, where the system determines whether the fuel cell system has been off. If the system was off, it proceeds to block 115 to determine whether the hydrogen level in the anode exceeds a minimum concentration. The value is determined through testing by starting the fuel cell at various initial gas concentrations (various soak times) and not allowing any purge, flush, or fill to occur on the anode. Hydrogen will be inputted into the system, but nothing will be expelled. The minimum concentration is generally greater than about 70%, or greater than about 75%, or greater than about 80%, or greater than about 85%, or greater than about 90%.

If the hydrogen level does not exceed the minimum concentration, the system proceeds to the anode flush function at block 120 followed by the anode fill function at block 125. A header purge function can precede the anode flush function, if desired. The high voltage contactors are then closed at block 130. The anode flush function is one in which a high flow rate through the anode is utilized to raise the hydrogen concentration in the anode flow channels as quickly as possible without exceeding the emissions limits. This is accomplished using a valve 66 with a high $k_v$. The anode fill function is a slower fill of the anode which is used when the anode contains or is assumed to contain a threshold level of hydrogen. A slow fill is needed in this case so that emissions requirements are not violated. This is accomplished using a smaller valve such as drain valve 62.

If the hydrogen level exceeds the specified level at block 115, the system proceeds to block 130 to close the contactors.

If at decision block 105 the system determined that the fuel cell system was exiting from standby, it proceeds to block 130 to close the contactors.

Before the high voltage contactors are closed under any of these paths, the cell voltage is monitored. This is accomplished by driving a load that is directly connected to the stack. Any load that could be applied directly to the stack before closing the contactors could be used, such as end cell heaters. When the cell voltage is within an acceptable range, the high voltage contactors are closed.

After the contactors are closed at block 130, the system proceeds to decision block 135 to determine whether the stack voltage is stable. The stability of the stack voltage can be determined in a variety of ways known to those of skill in the art. For example, the voltage difference between the maximum and minimum cells on both stacks can be measured. Alternatively, the ratio of the minimum cell voltage to the average cell voltage can be calculated. Another method involves using the standard deviation of the cell voltages after the average cell voltage exceeds a threshold. One or more of these methods (or other suitable methods) can be used as desired. In addition, one or more methods can be used while the stack is under load (e.g., immediately following contactor closure).

If the stack voltage is not stable, the system proceeds to block 140 for voltage stabilization using the center bleed parallel flow in which the drain valve 62 would be opened. For center bleed parallel flow operation, the drain or center bleed valve 62 is opened instead of sequential operation of bleed valves 50 and 52, and both injectors 38 and 44 are operated simultaneously rather than sequentially as described above for normal operation. During this voltage stabilization, any load requests from the driver are ignored.

The system then returns to block 135 to determine if the stack voltage is stable. If the stack voltage is stable, the system proceeds to block 145, and initiates the run function 150 and the voltage stabilization function 155. These two functions run concurrently, which reduces the start-up time. This voltage stabilization function will honor driver power requests because the run function is operating concurrently.

Figure 3B:
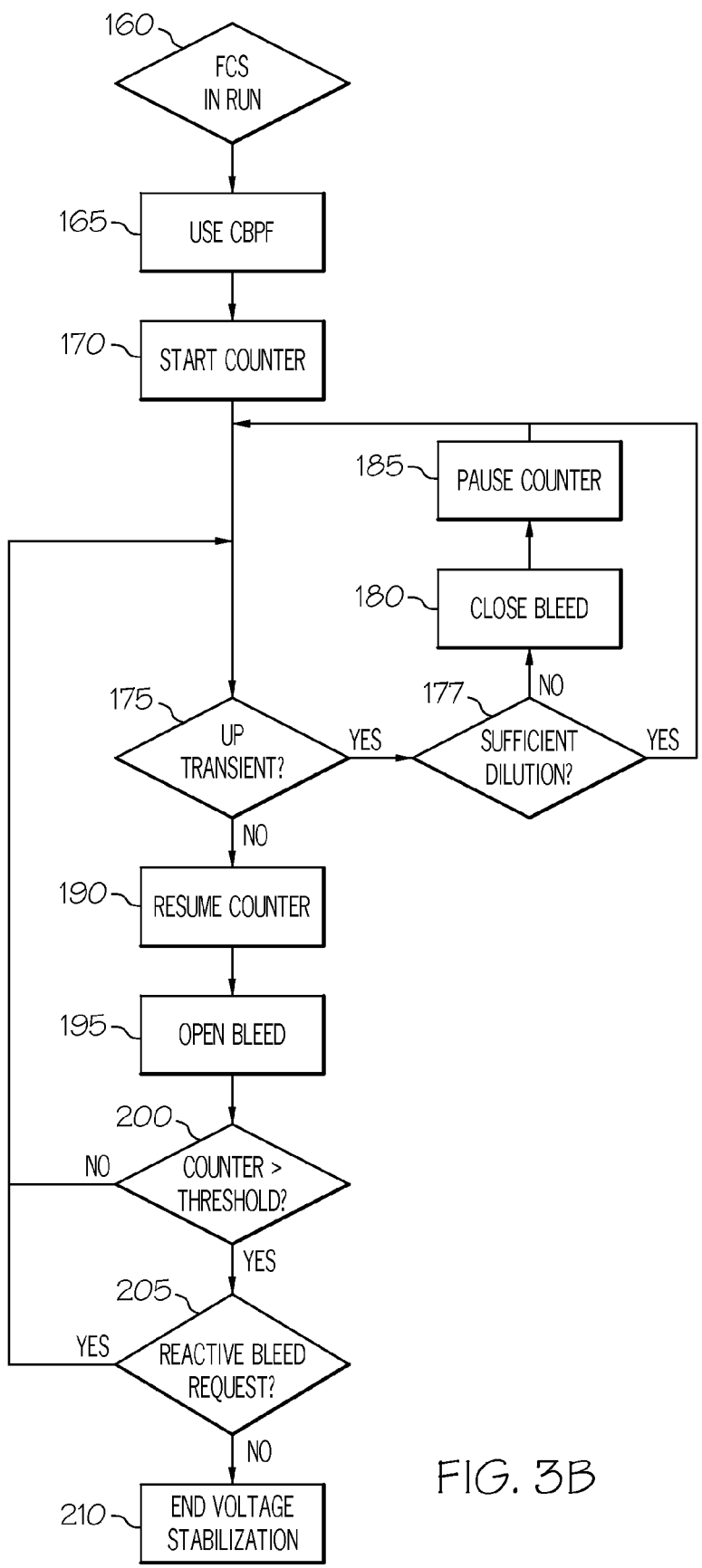

The details of one embodiment of the concurrent voltage stabilization function are shown in FIG. 3B. At block 160, the system determines whether the fuel cell system has transitioned to run. If it has, the system proceeds to block 165 where parallel flow to the stacks occurs and the center bleed valve 62 is opened. At block 170, a counter is started. The counter is a timer which keeps counting as long as the center bleed valve 62 is open or until a measured volume flow of gas has passed. The system proceeds to decision block 175 where it determines if an up transient condition exists. An up transient condition is a function where independently measured and calculated signals are used to determine that a significant increase in the current drawn from the stack is about to take place. Control of up transient conditions is described in U.S. Publication Nos. 2008/0081225 and 2008/0187804, which are incorporated herein by reference. The rate of change of the cathode oxygen set point and the rate of change of the cathode valve position commands can be monitored. Once the rate of change is greater than a threshold, an up transient request is set. The up-transient request can have certain specific filters associated with it. It is typically a step change in the load request that can be detected by the methods discussed above, or by measuring the rate of change in the current. The current signal could be used, but it is often too noisy. This allows preventative measures to be taken in order to meet the power demand as well as meeting the emissions target. If an up transient condition exists, the system proceeds to decision block 177 and determines whether there is sufficient dilution flow. If there is sufficient dilution flow, the system returns to decision block 175. If there is not sufficient dilution flow at block 177, the system proceeds to block 180 where the center bleed valve 62 is closed. The counter is paused at block 185, and the system returns to decision block 175.

If an up transient condition does not exist (or no longer exists), the counter resumes at block 190 (if it was paused). The center bleed valve is opened (if it was closed) at block 195. The system proceeds to decision block 200 where it determines whether the counter exceeds a calibrated threshold, which could be either a predetermined time or a predetermined volume of gas. If the counter does not exceed the calibrated threshold, the system returns to decision block 175. The threshold is determined through testing of the system. Many factors, such as length of start without the concurrent voltage stabilization, hydrogen consumption, and the age of the stacks, can affect the calibrated threshold. For example, one method of determining the threshold would be to compare the start length without concurrent voltage stabilization with the start length using concurrent voltage stabilization. If a start without concurrent voltage stabilization took about 7 sec and a start using concurrent voltage stabilization was reduced by about 2 sec, the threshold could be set to about 2 sec to ensure that the previous levels of inputted hydrogen and flush were being met.

If the counter exceeds the calibrated threshold, the system continues to decision block 205 where it determines whether there is a reactive bleed request. The reactive bleed request is a response to an abnormality in the system. A primary cause of reactive bleed requests is the nitrogen level in the cells. If the nitrogen concentration in the anode exceeds a threshold value, one or more of the cell voltages will typically respond by dropping considerably. In previous systems, when a voltage drop is detected, a bleed valve, for example, bleed valve 50 or 52 (only one is open at a time during flow shifting) shown in FIG. 2, would be opened to purge as much of the nitrogen as possible. However, in the present system. after start and during the beginning of run, center bleed parallel flow is preferred, so drain valve 62 is opened. Other causes of reactive bleed requests include, but are not limited to, liquid water blocking the flow channels, or ice formation.

If the system detects a reactive bleed request, it returns to decision block 175. If there is no reactive bleed request, the voltage stabilization function ends at block 210.

This start-up method allows for quick exit from standby mode and reduces the time until acceptable drive away in normal startup sequences. It improves start reliability by further increasing anode hydrogen concentration after the start sequence is completed. In addition, it accounts for incomplete anode flush due to system variability and non-uniform stack flow.

It is noted that recitations herein of a component of an embodiment being "configured" in a particular way or to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural factors of the component.

It is noted that terms like "generally," "commonly," and "typically," when utilized herein, are not utilized to limit the scope of the claimed embodiments or to imply that certain features are critical, essential, or even important to the structure or function of the claimed embodiments. Rather, these terms are merely intended to identify particular aspects of an embodiment or to emphasize alternative or additional features that may or may not be utilized in a particular embodiment.

For the purposes of describing and defining embodiments herein it is noted that the terms "substantially," "significantly," and "approximately" are utilized herein to represent the inherent degree of uncertainty that may be attributed to any quantitative comparison, value, measurement, or other representation. The terms "substantially," "significantly," and "approximately" are also utilized herein to represent the degree by which a quantitative representation may vary from a stated reference without resulting in a change in the basic function of the subject matter at issue.

Having described embodiments of the present invention in detail, and by reference to specific embodiments thereof, it will be apparent that modifications and variations are possible without departing from the scope of the embodiments defined in the appended claims. More specifically, although some aspects of embodiments of the present invention are identified herein as preferred or particularly advantageous, it is contemplated that the embodiments of the present invention are not necessarily limited to these preferred aspects.

What is claimed is:

1. A method of reducing the start-up time for a fuel cell comprising:
    initiating a start sequence;
    after initiating the start sequence, concurrently initiating a run sequence including supporting load requests for the fuel cell, and stabilizing a voltage of the fuel cell;
    wherein stabilizing the voltage of the fuel cell comprises:
    providing a flow of hydrogen to the fuel cell and opening a center drain valve, wherein the hydrogen flow continues for a predetermined volume of hydrogen or a predetermined time; and
    ending voltage stabilization after the predetermined volume of hydrogen or the predetermined time is exceeded while continuing the run sequence including supporting the load requests for the fuel cell.

2. The method of claim 1 further comprising:
    after providing the flow of hydrogen to the fuel cell and opening the center drain valve, determining whether an up transient condition exists;
    if the up transient condition exists, determining whether sufficient dilution air flow is present to obtain a targeted exhaust concentration;
    if the up transient condition exists and if sufficient dilution air flow is not present, closing the center drain valve, pausing a counter for the predetermined volume of hydrogen or the predetermined time, and returning to determining whether the up transient condition exists;
    if the up transient condition exists, and if sufficient dilution air flow is present, returning to determining whether the up transient condition exists; and
    if the up transient condition does not exist or when the up transient condition no longer exists, resuming the counter if the counter is paused, and opening the center drain valve if the center drain valve is closed.

3. The method of claim 2 wherein determining whether the up transient condition exists comprises determining whether a rate of change of a cathode oxygen setpoint, or a rate of change of a cathode valve position, or a rate of change of a current exceeds a predetermined value.

4. The method of claim 2 wherein if the up transient condition exists, increasing the flow of hydrogen.

5. The method of claim 2 further comprising:
    if the up transient condition does not exist or when the up transient condition no longer exists, determining whether the predetermined volume of hydrogen or the predetermined time is exceeded;
    if the predetermined volume of hydrogen or the predetermined time is not exceeded, returning to determining whether the up transient condition exists.

6. The method of claim 2 further comprising:
    if the up transient condition does not exist or when the up transient condition no longer exists, determining whether the predetermined volume of hydrogen or the predetermined time is exceeded;
    if the predetermined volume of hydrogen or the predetermined time is exceeded, determining whether a reactive bleed request exists;
    if the reactive bleed request exists, returning to determining whether an up transient condition exists;
    if the reactive bleed request does not exist, ending voltage stabilization.

7. The method of claim 6 wherein determining whether the reactive bleed request exists comprises determining whether a cell voltage is less than a predetermined voltage.

8. The method of claim 1 further comprising:
    after providing the flow of hydrogen to the fuel cell and opening the center drain valve, initiating a counter for the predetermined volume of hydrogen or the predetermined time, and determining whether an up transient condition exists;
    if the up transient condition exists, determining whether sufficient dilution air flow is present to obtain a targeted exhaust concentration;
    if the up transient condition exists and if sufficient dilution air flow is not present, closing the center drain valve, pausing the counter for the predetermined volume of hydrogen or the predetermined time, and returning to determining whether the up transient condition exists;
    if the up transient condition exists and if sufficient dilution air flow is present, returning to determining whether the up transient condition exists;
    if the up transient condition does not exist or when the up transient condition no longer exists, resuming the counter if the counter is paused, and opening the center drain valve if the center drain valve is closed;
    determining whether the counter exceeds the predetermined volume of hydrogen or the predetermined time;
    if the counter does not exceed the predetermined volume of hydrogen or the predetermined time, returning to determining whether the up transient condition exists;
    if the counter exceeds the predetermined volume of hydrogen or the predetermined time, determining whether a reactive bleed request exists;
    if the reactive bleed request exists, returning to determining whether the up transient condition exists; and
    if the reactive bleed request does not exist, ending voltage stabilization.

9. The method of claim 8 wherein determining whether the up transient condition exists comprises determining whether a rate of change of a cathode oxygen setpoint, or a rate of change of a cathode valve position, or a rate of change of a current exceeds a predetermined value.

10. The method of claim 8 wherein if the up transient condition exists, increasing the flow of hydrogen.

11. The method of claim 8 wherein determining whether the reactive bleed request exists comprises determining whether a cell voltage is less than a predetermined voltage.

12. The method of claim 8 wherein the flow of hydrogen to the fuel cell is parallel flow with center bleed.

13. The method of claim 1 further comprising:
    before concurrently supporting load requests for the fuel cell and stabilizing the voltage of the fuel cell, determining whether the fuel cell system is exiting standby;
    if the fuel cell system is not exiting standby, determining whether the fuel cell system was off;

if the fuel cell system was off, determining whether an anode side of the fuel cell has a minimum concentration of hydrogen;

if the minimum concentration of hydrogen is not present, providing hydrogen to the anode side;

if the system is exiting standby, or if the minimum concentration of hydrogen is present, or after providing hydrogen to the anode side, closing a high voltage contactor;

determining whether a stack voltage is stable after closing the high voltage contactor; and if the stack voltage is not stable, opening the center drain valve, and returning to determining whether the stack voltage is stable.

14. The method of claim 13 wherein the minimum concentration of hydrogen is about 70%.

15. A method of reducing the start-up time for a fuel cell comprising:

initiating a start sequence;

after initiating the start sequence, concurrently initiating a run sequence including supporting load requests for the fuel cell, and stabilizing a voltage of the fuel cell;

wherein stabilizing the voltage of the fuel cell comprises:

providing a flow of hydrogen to the fuel cell and opening an center drain valve, wherein the hydrogen flow continues for a predetermined volume of hydrogen or a predetermined time;

initiating a counter for the predetermined volume of hydrogen or the predetermined time;

determining whether an up transient condition exists;

if the up transient condition exists, determining whether sufficient dilution air flow is present to obtain a targeted exhaust concentration;

if the up transient condition exists and if sufficient dilution air flow is not present, closing the center drain valve, pausing the counter for the predetermined volume of hydrogen or the predetermined time, and, and returning to determining whether the up transient condition exists;

if the up transient condition exists and if sufficient dilution air flow is present, returning to determining whether the up transient condition exists;

if the up transient condition does not exist or when the up transient condition no longer exists, resuming the counter if the counter is paused, and opening the center drain valve if the center drain valve is closed;

determining whether the counter exceeds the predetermined volume of hydrogen or the predetermined time;

if the counter does not exceed the predetermined volume of hydrogen or the predetermined time, returning to determining whether the up transient condition exists;

if the counter exceeds the predetermined volume of hydrogen or the predetermined time, determining whether a reactive bleed request exists;

if the reactive bleed request exists, returning to determining whether the up transient condition exists; and if the reactive bleed request does not exist, ending voltage stabilization while continuing the run sequence including supporting the load requests for the fuel cell.

16. The method of claim 15 wherein determining whether the up transient condition exists comprises determining whether a rate of change of a cathode oxygen setpoint, or a rate of change of a cathode valve position, or a rate of change of a current exceeds a predetermined value.

17. The method of claim 15 wherein if the up transient condition exists, increasing the flow of hydrogen.

18. The method of claim 15 wherein determining whether a reactive bleed request exists comprises determining whether a cell voltage is less than a predetermined voltage.

19. The method of claim 15 wherein the flow of hydrogen to the fuel cell is parallel flow with center bleed.

20. The method of claim 15 further comprising:

before concurrently supporting load requests for the fuel cell and stabilizing the voltage of the fuel cell, determining whether the fuel cell system is exiting standby;

if the fuel cell system is not exiting standby, determining whether the fuel cell system was off;

if the fuel cell system was off, determining whether an anode side of the fuel cell has a minimum concentration of hydrogen;

if the minimum concentration of hydrogen is not present, providing hydrogen to the anode side;

if the system is exiting standby, or if the minimum concentration of hydrogen is present, or after providing hydrogen to the anode side, closing a high voltage contactor;

determining whether a stack voltage is stable after closing the high voltage contactor; and if the stack voltage is not stable, opening the center drain valve, and returning to determining whether the stack voltage is stable.

21. The method of claim 20 wherein the minimum concentration of hydrogen is about 70%.

* * * * *